United States Patent [19]

Ogawa

[11] Patent Number: 4,530,586
[45] Date of Patent: Jul. 23, 1985

[54] APPARATUS FOR THE SETTING OF EXPOSURE CONTROL MODE IN CAMERA

[75] Inventor: Hidehiro Ogawa, Tokyo, Japan

[73] Assignee: Nippon Kogaku K. K., Tokyo, Japan

[21] Appl. No.: 638,409

[22] Filed: Aug. 7, 1984

[30] Foreign Application Priority Data

Aug. 11, 1983 [JP] Japan .............................. 58-147141

[51] Int. Cl.³ .............................................. G03B 7/08
[52] U.S. Cl. .................................. 354/442; 354/289.1
[58] Field of Search ..................... 354/442, 441, 289.1

[56] References Cited

U.S. PATENT DOCUMENTS

| | | | |
|---|---|---|---|
| 4,165,929 | 8/1979 | Ito et al. ............................. | 354/442 |
| 4,175,842 | 11/1979 | Sakurada et al. ................... | 354/442 |
| 4,295,716 | 10/1981 | Numata ............................... | 354/442 |
| 4,306,785 | 12/1981 | Tano et al. .......................... | 354/442 |
| 4,365,880 | 12/1982 | Kiuchi et al. ....................... | 354/442 |

Primary Examiner—Russell E. Adams
Attorney, Agent, or Firm—Shapiro and Shapiro

[57] ABSTRACT

A mode-setting apparatus for a camera is selectively operable in various exposure control modes including, in particular, aperture priority mode and shutter speed priority mode. The mode setting apparatus is provided with means for detecting the presetting of aperture value and time value and means for selectively setting aperture priority mode or shutter speed priority mode in accordance with the detection signal from the detecting means. The mode-setting means selects the aperture priority when the aperture value is preset latest by the operator. When the time value is preset latest, the mode setting means selects the shutter speed priority mode. In this manner, one of the automatic exposure control modes is automatically selected and set in the camera as priority mode in response to the manual presetting operation latest done by the operator. When the operator wishes to set the aperture priority mode, it can be made by the operator's presetting the aperture-presetting member to a desired aperture value. When the operator wishes to change over the mode to shutter speed priority mode, it is only required for the operator to change the value of shutter speed to a desired time value by a manual operation of the shutter time-presetting member.

6 Claims, 6 Drawing Figures

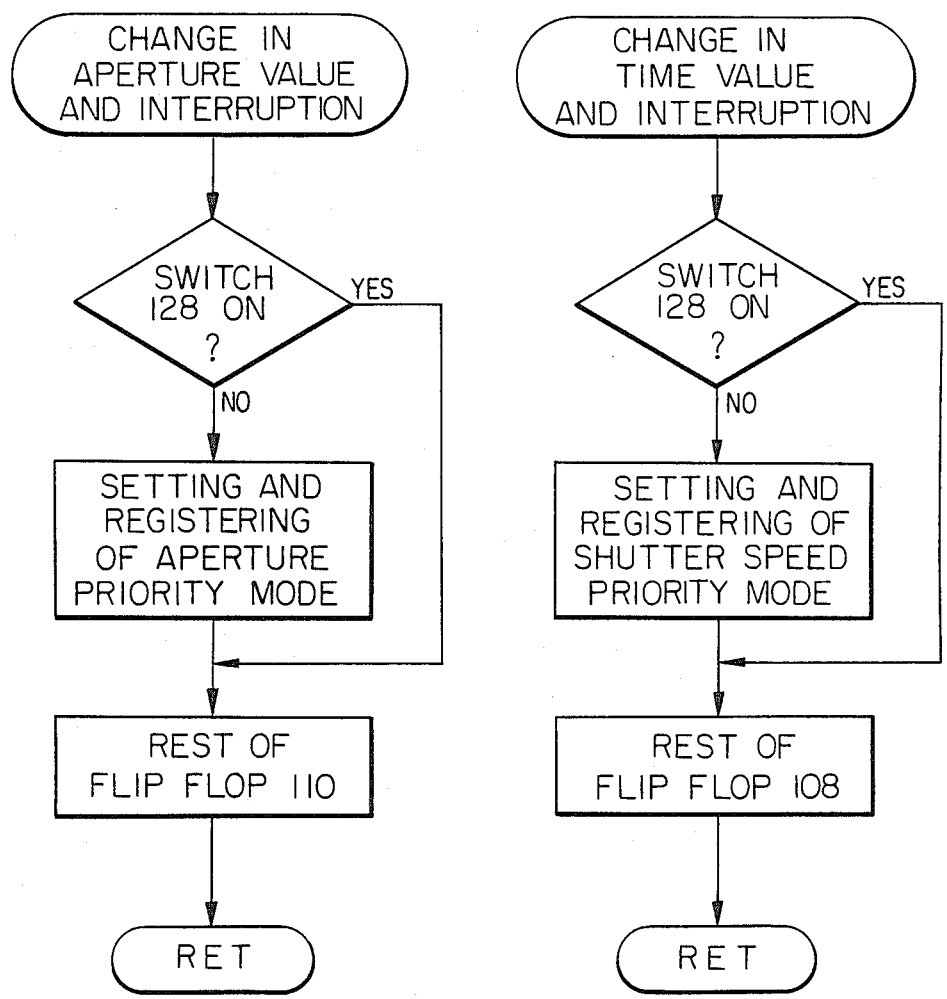

APPARATUS FOR THE SETTING OF EXPOSURE CONTROL MODE IN CAMERA

BACKGROUND OF THE INVENTION

1. Field of the Invention

The present invention relates to an automatic exposure control camera. More particularly, the present invention relates to a mode-setting apparatus for a camera selectively operable in various exposure control modes including, in particular, aperture priority mode and shutter speed priority mode.

2. Description of the Prior Art

In the art of automatic exposure control camera there have already been developed and brought into the market those cameras provided with a socalled two-priority type of exposure control system. This type of camera is operable not only in aperture priority mode but also in shutter speed priority mode selectively. When the aperture priority mode is selected, the value of shutter speed is automatically controlled in accordance with an aperture value preset by the operator. When the shutter speed priority mode is selected, the value of aperture is automatically controlled in accordance with a shutter speed preset by the operator.

However, the above-mentioned type of prior art camera has an important drawback in view of easy operation. It needs troublesome mode-setting operations. To set any desired one of aperture priority mode and shutter speed priority mode, the operator needs to manually operate a mode-setting member particularly provided for this purpose. In link with the operation of the mode-setting member, a mode-setting switch is switched over to the desired mode. In addition, when the shutter speed priority mode is selected, it is needed for the operator to set the aperture-presetting ring to the maximum (or minimum) aperture value. These manual operations have to be done previously to picture-taking and trouble the operator very much. In other words, all of the two-priority mode exposure control cameras according to the prior art are not of easy operation.

SUMMARY OF THE INVENTION

Accordingly it is an object of the invention to overcome the drawback of the prior art camera as mentioned above.

It is a more specific object of the invention to provide an improved system for setting exposure control mode in camera, which is easy to operate and able to respond to the operator's will promptly and correctly.

According to the invention, the above objects are attained by the provision of means for detecting the presetting of aperture value and time value and means for selectively setting aperture priority mode or shutter speed priority mode in accordance with the detection signal from said detecting means. Said mode-setting means selects the aperture priority when the aperture value is preset latest by the operator. When the time value is preset latest, said mode setting means selects the shutter speed priority mode. In this manner, one of the automatic exposure control modes is automatically selected and set in the camera as priority mode in response to the manual presetting operation latest done by the operator.

Therefore, according to the invention, when the operator wishes to set the aperture priority mode, it can be made by the operator's presetting the aperture-presetting member to a desired aperture value. When the operator wishes to change over the mode to shutter speed priority mode, it is only required for the operator to change the value of shutter speed to a desired time value by a manual operation of the shutter time-presetting member. In the automatic exposure control camera according to the present invention, therefore, the operation required for the change-over of the mode between aperture priority mode and shutter speed priority mode is very simple and can be made promptly and correctly. Since the operation is very simple, all of operational errors as occurred in the prior art two-priority exposure control system can be eliminated by the present invention.

Other and further objects, features and advantages of the invention will appear more fully from the following description taken in connection with the accompanying drawings.

BRIEF DESCRIPTION OF THE DRAWINGS

FIG. 4 is a plan view of AV (aperture value) detector and TV (time value) detector in FIG. 3;

FIG. 5 is a flow chart of the priority mode-setting steps in FIG. 3 embodiment, of which FIG. 5A is of the setting of aperture priority mode and FIG. 5B is of the setting of shutter speed priority mode.

DESCRIPTION OF PREFERRED EMBODIMENTS

Figure 1:
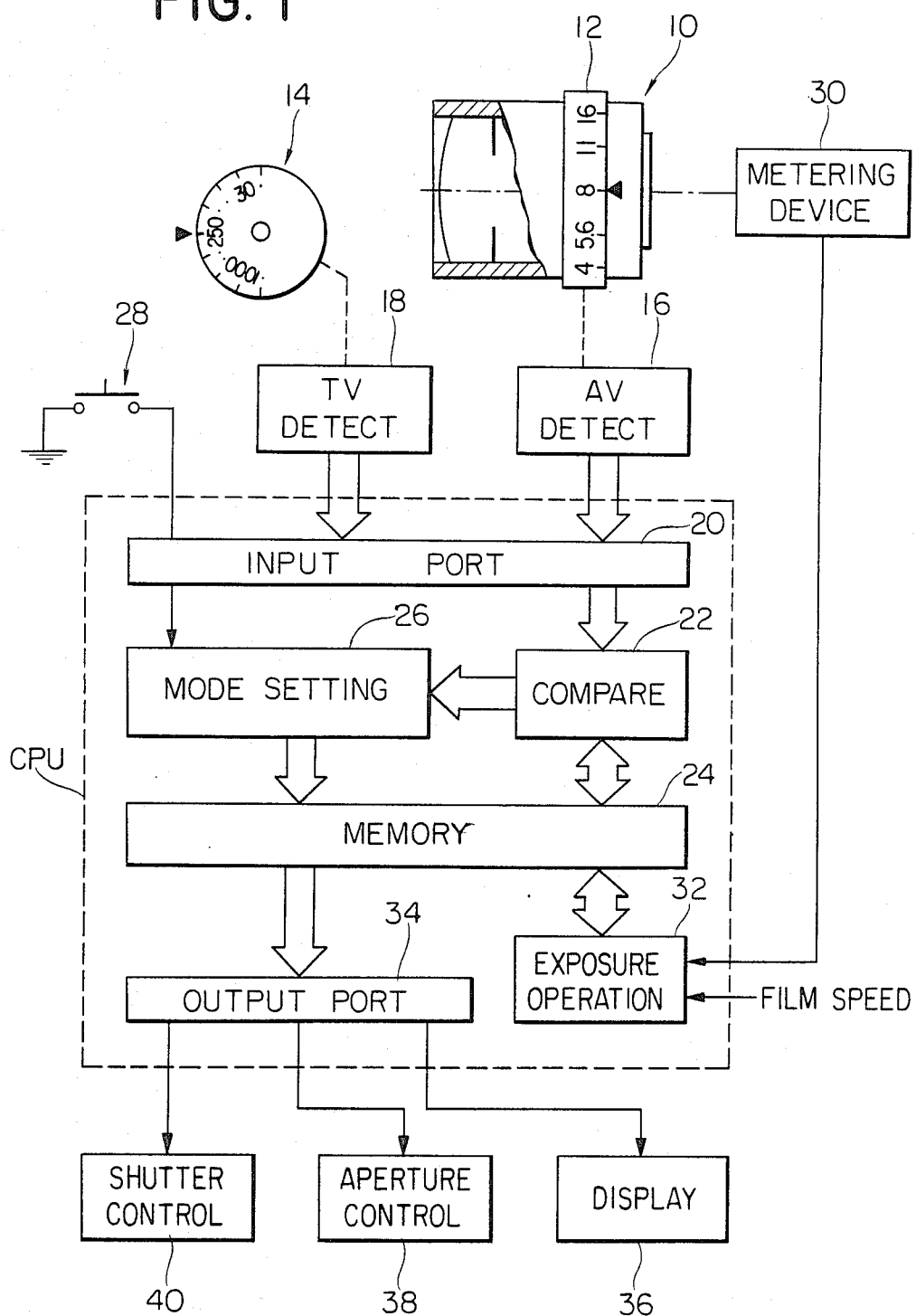
FIG. 1 is a circuit block diagram showing an embodiment of the invention.

Referring first to FIG. 1 showing a basic form of the mode-setting system according to the invention, reference numeral 10 denotes a taking-lens and 12 denotes an aperture-presetting ring. 14 is a shutter dial. An aperture value can be preset by the operator's manual operation of the diaphragm-presetting ring 12. A time value can be preset by the manual operation of the shutter dial 14. The preset aperture value is read by an AV (aperture value) detector 16 and the preset time value is read by a TV (time value) detector 18. The detectors read the preset values in digital code respectively. In order to transform the rotations of the aperture-presetting ring 12 and the shutter dial 14 into binary signals, the AV detector and the TV detector have each a grey code disc. Digital codes from the detectors are transmitted to input ports 20 of a central processing unit CPU. In the CPU, the aperture value and the time value now input are compared to the aperture value and the time value previously registered in a memory 24 by a comparator part 22. Usually the aperture value and the time value registered in the memory are those values preset by the latest operations of the aperture-presetting ring and the shutter dial.

When there is found any difference between the aperture value now preset and the aperture value previously registered in the memory or between the time value now preset and the time value in the memory, the comparator 22 transmits an output signal to a mode-setting part 26 of the CPU. The mode-setting part selects and sets one of the automatic exposure control modes in accordance with the signal from the comparator part 22 while giving priority to the mode the exposure factor of which has just been renewed by the present presetting operation. Thus, when the difference is found in aperture value, the mode-setting part sets the aperture priority mode for the camera. On the contrary, when the difference is found in time value, the shutter speed priority mode is set by the mode-setting part. At the same time, the renewed aperture value or time value is registered in the memory 24 through the mode-setting part. In the embodiment, the memory 24 may be composed of read-only memory (ROM) or random access memory (RAM).

The mode-setting part 26 receives also ON-OFF signal of an operation switch 28 which is a normally opened switch. So long as the switch 28 is in its normal state, that is, in the position of OFF, it allows the mode-setting part 26 to set the aperture priority mode or the shutter speed priority mode in accordance with the signal from the comparator part 22. As mentioned above, the mode selected as priority mode by the mode-setting part is the mode the exposure factor of which has just been renewed. The memory 24 receives and stores therein information of the priority mode now selected and set by the mode-setting part 26. If the operation switch 28 is closed (turned to ON) after the information has been stored in the memory 24, then the priority mode is fixed. In this state no further changeover of mode is allowed even when the other exposure factor is renewed afterwards.

In case that the aperture priority mode is set by the mode-setting part, the aperture value from the AV detector 16 is introduced into an exposure operation part 32 together with information of film speed of the film loaded on the camera and information of brightness of the object detected by a metering device 30. From these information given to it the exposure operation part 32 determines a suitably controlled time value corresponding to the preset aperture value. The time value thus determined is provisionally registered in the memory 24.

Similarly, in case that the shutter speed priority mode is set by the mode-setting part, the time value from the TV detector 18 is introduced into the exposure operation part 32. The operation part 32 determines a controlled aperture value corresponding to the preset aperture value in the manner similar to the above.

The information of the mode now set as well as the controlled time value or the controlled aperture value now registered in the memory 24 are displayed on a display device 36 through output ports 34. Also, an aperture controlling system 38 and a shutter controlling system 40 of the camera start operating in accordance with the controlled aperture value and the controlled time.

Figure 2:
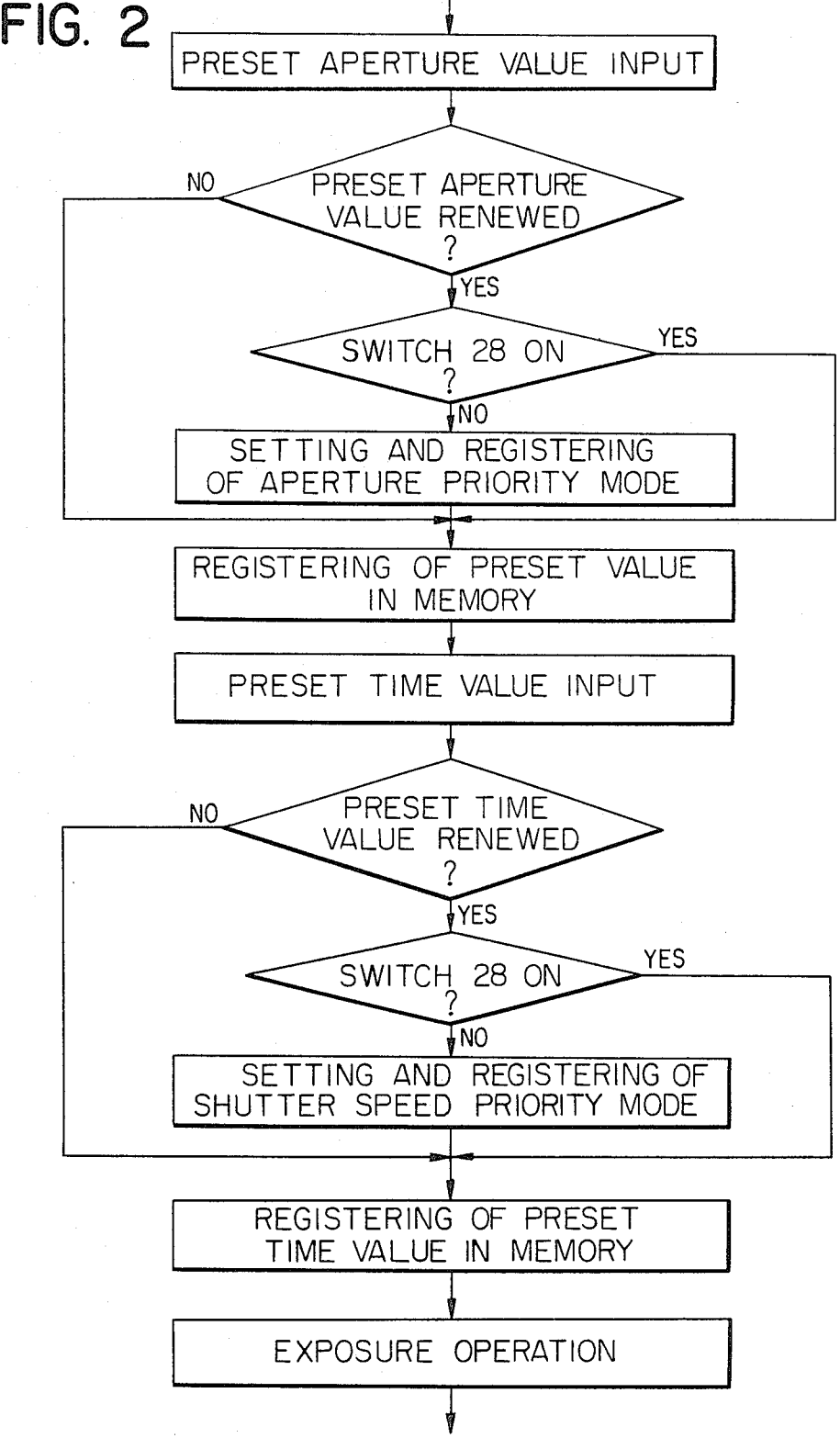
FIG. 2 is a flow chart showing the priority mode-setting operation in the embodiment.

The manner of operation of the essential part of the above embodiment will hereinafter be described in detail with reference to a flow chart shown in FIG. 2.

For purpose of explanation it is assumed that the operation switch 28 is now in the opened state (OFF), the shutter dial 14 is in the position preset to 1/250 sec. and the lens aperture-presetting ring 12 is the position preset to F8 as shown in FIG. 1 and that all of these preset values have already been registered in the memory 24 through the input port 20.

As an example, let us consider the case where the aperture value is changed from F8 to F11 by the operator starting from the above position. When the aperture value F11 is preset anew, the new preset aperture value F11 is read by the AV detector 16 and then introduced into the CPU through the input port 20. In CPU, the comparator 22 compares the new preset aperture value (F11) to the aperture value previously registered in the memory 24 (F8) inquiring of whether the preset aperture value is renewed or not. In the case of the present example, the aperture value put in this time is F11 which differs from the previously registered aperture value F8. Therefore, the operation sequence is advanced toward the step of setting of aperture priority mode by the mode-setting part 26. As the operation switch 28 is in its opened position (OFF) which allows the mode-setting part to set a priority mode, the mode-setting part selects and sets the aperture priority mode. Information of the selected mode is registered in the memory 24. At the same time, the renewed aperture value, F11 is also registered in the memory for the next detection of change in aperture value. In this manner, detection of change in position of the aperture-presetting ring 12 and the corresponding mode-setting operation are completed. Subsequent to it, the preset time value is read by the TV detector 18 and then introduced into the CPU through the input port 20. The input preset time value and the previously registered time value in the memory are compared to each other by the comparator 22. In the case of this example, the time value remains unchanged at 1/250 sec. Therefore, the operation sequence is advanced directly to the step of registering of preset time value in memory bypassing the step of operation of the mode-setting part 26. Thus, the same preset time value is registered again in the memory 24 for the next detection of change in preset time value. By this step, a sequence of operations for the selection and setting of priority mode are all completed. As previously mentioned, the operation switch 28 is used to fix the selected one priority mode, aperture priority mode or shutter speed priority mode suitable for the aimed picture-taking. The switch 28 can be closed at operator's will to prevent the selected priority mode from being unintentionally changed.

After completing the sequential operations from the step of data input of preset aperture value to the step of registering of preset time value, a controlled time value corresponding to the renewed aperture value is determined by an exposure operation according to the selected aperture priority mode. The controlled time value thus determined is registered in the memory 24. Further, the sequence of from the step of data input of preset aperture value to the step of exposure operation is repeated until the shutter is released to start the exposure. At the time, if the operator wishes to fix the exposure control mode to the aperture priority mode, it can be made by closing the switch 28. In response to the ON-signal of the switch 28, the mode-setting part 26 operates to make the preset aperture value F11 reregistered in the memory. Consequently, even if the shutter dial 14 is moved to change the preset time value after that, the priority mode once selected can not be changed further by it but remians fixed. The new preset time value is merely registered in the memory in substitution for the previously registered time value.

In case that the switch 28 has already been closed prior to the change of aperture value from F8 to F11, neither the step of setting and registering of aperture priority mode through the mode-setting part 26 nor the step of setting and registering of shutter speed priority mode through the mode-setting part can be executed. In this case, since the switch 28 keeps fixed the priority mode which has been set and registered in accordance with the change in aperture value or time value made directly before the closing of the switch, the exposure operation is carried out according to the fixed mode.

The memory is so formed as to be able to hold the information registered in it even when the power source of the camera is cut off. Therefore, when the power source of the camera is turned on again, the priority mode stored in the memory is set and held again, and also the priority mode is displayed on the display device 36.

A second embodiment of the invention will be described with reference to FIG. 3.

In a camera of the type in which an exposure operation is carried out by analog processing, the data of aperture value and time value are generally put in the form of voltage. In this type of camera, therefore, it is possible to select and set a priority mode in accordance with a detection signal from a detector which detects the change of voltage produced by the operator's presetting of a new aperture value or time value. It is also possible to transform the movement of the aperture-presetting ring or of the shutter dial into a periodic signal and to detect the change of aperture value or time value from the generation of such a periodic signal. These methods enable to set a desired priority mode in a very simple manner.

Figure 3:
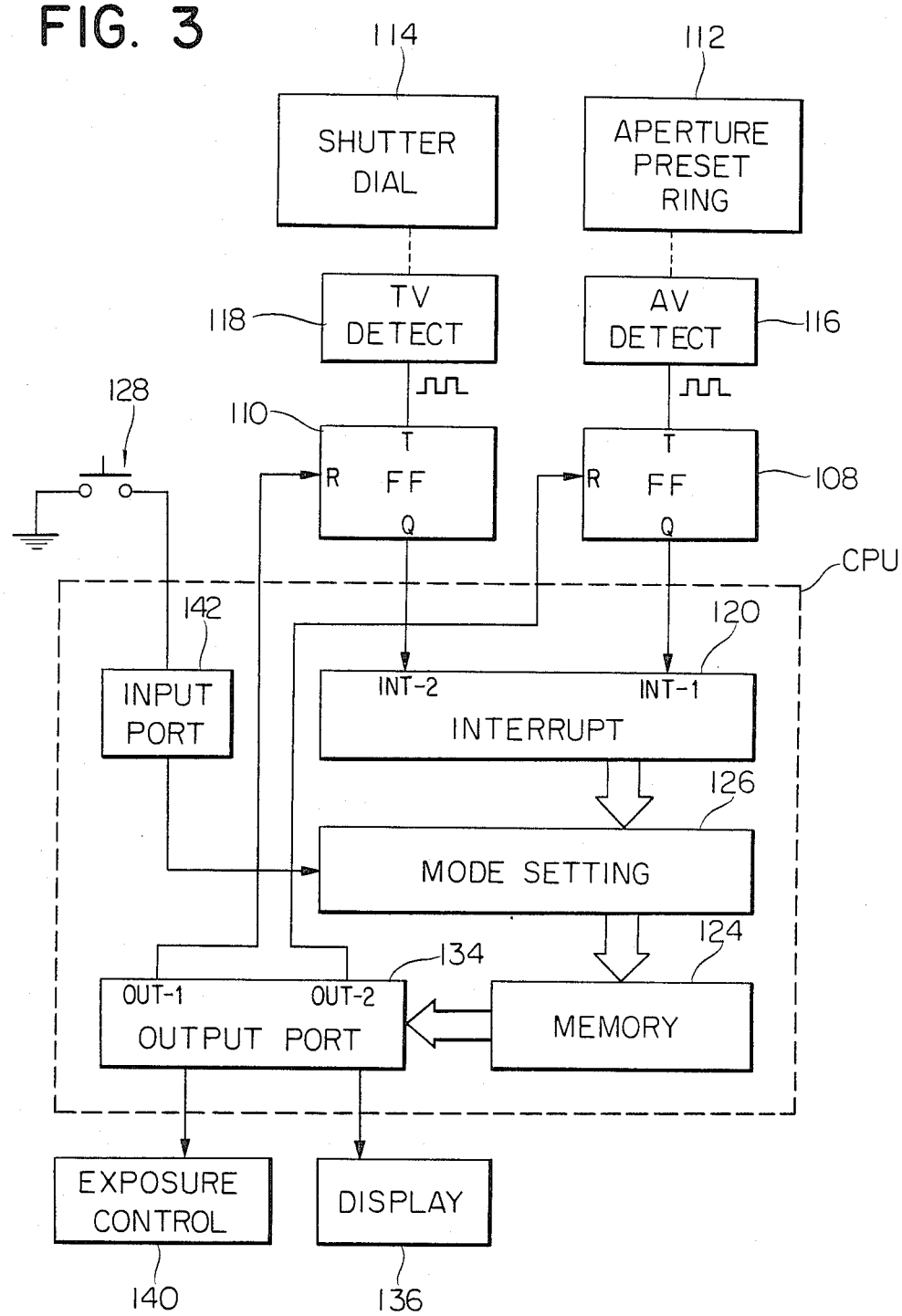
FIG. 3 is a circuit block diagram showing a second embodiment of the invention.

Referring to FIG. 3, an AV detector 116 is interlocked with an aperture preset ring 112 whereas a TV detector 118 is interlocked with a shutter dial 114. The AV detector 116 and the TV detector 118 have substantially the same structure which is shown in FIG. 4. As seen in FIG. 4, the detector is composed of a train of contacts 102 and a brush 104 arranged for relative displacement between the contact train and the brush. A voltage of +V is applied to the contact train 102 through a resistor 106. The brush 104 is grounded. At the connection point of resistor 106 and contact train 102 there is provided an output terminal. According to the relative displacement mentioned above, a periodic signal appears at the output terminal. The detectors 116 and 118 are formed in such manner that the contact 102 and the brush 104 can produce the state of conduction/non-conduction more than one cycle for one step of change in aperture value and time value respectively and thereby the displacement of the aperture preset ring 112 and the shutter dial 114 can be detected directly by the detectors.

The detection signals generated from the AV detector 116 and the TV detector 118 are applied to flip-flops 108 and 110 respectively to change the outputs of the flip-flops. With the change of the output of the flip-flop 108 or 110 there is effected an interruption through interruption means 120 of CPU. When the interruption is effected by the output change of the flip-flop 108, the mode-setting part 126 sets the aperture priority mode. The mode set by the mode-setting part is then registered in a memory 124. The registered aperture priority mode is displayed on a display device 136 through the output port 134. In accordance with the output signal from the output port 134, an exposure control apparatus 140 controls the shutter speed automatically to a value corresponding to the aperture value set in analog value.

On the other hand, a reset signal is generated from one output OUT-1 of the output port 134. The reset signal resets the flip-flop 110 driven by the TV detector 118. When the flip-flop 110 is reset, the detection signal of TV detector 118 is allowed to be transmitted to the interruption means 120. Therefore, if the shutter dial 114 is rotated after the above rotation of the aperture preset ring 112, the change of output of the flip-flop 110 is transmitted to the interruption means 120 so that the mode is changed over to the shutter speed priority mode by the mode-setting part 126. In order to prevent any careless setting of undesirable priority mode there may be provided an operation switch 128 the function of which is the same as that of the switch 28 previously shown in FIG. 1. The priority mode already set can be fixed by inputting the signal of the switch 128 through the input port 142.

In the second embodiment shown in FIG. 3, the setting of aperture priority mode is executed in accordance with the flow chart shown in FIG. 5A, which is as follows:

Change in aperture value, if any, is detected by AV detector 116 and the corresponding change in output of the flip-flop 108 is transmitted to interruption means 120. An interruption responding to the change in aperture value is effected by it. Then, the aperture priority mode is selected and set by the mode-setting part 126 provided that the operation switch 128 is in its opened position (OFF) at that time. The mode set by the mode-setting part is registered in the memory 124. An output signal in accordance with the set aperture priority mode is applied to the flip-flop 110 through the output port 134. The flip-flop is reset by the signal. In this manner the setting of aperture priority mode is completed. If the switch 128 is in its closed position (ON) at the time of interruption, the flip-flop 110 is directly reset without setting and registering of aperture priority mode. In this case, the control of exposure is carried out in the mode previously registered in the memory.

The setting of shutter speed priority mode in the second embodiment is carried out in accordance with the flow chart shown in FIG. 5B, which is as follows:

Any change in time value by the shutter dial 114 is detected by TV detector 118. An interruption responding to the change in time value is effected through the flip-flop 110 and interruption means 120. The mode-setting part 126 selects and sets the shutter speed priority mode. The set mode is registered in the memory 124. An output signal representative of the registered shutter speed priority mode is applied to the flip-flop 108 through an output terminal OUT-2 of the output port 134. Thereby the flip-flop 108 is reset. The operation and processing related to the operation switch 128 in the flow chart shown in FIG. 5B correspond to those in FIG. 5A and need not be further described. It is to be understood that the function of the operation switch 128 is not limited to that shown in FIGS. 5A and 5B only. The switch may be used also to inhibit interruption responding to change in aperture value or time value by closing the switch.

While the invention has been particularly shown and described with reference to preferred embodiments thereof, it will be understood by those skilled in the art that the foregoing and other changes in form and details can be made therein without departing from the spirit and scope of the invention.

I claim:

1. In a camera provided with plural exposure control modes including aperture priority mode in which a time value is automatically set in accordance with an aperture value manually preset and shutter speed priority mode in which an aperture value is automatically set in accordance with a preset time value, a system for setting an exposure control mode comprising:

(a) aperture-presetting means to be operated to select an aperture value among different values;
(b) shutter speed-presetting means to be operated to select a time value among different values; and
(c) mode-setting means for selecting the aperture priority mode when said aperture-setting means is operated latest in time among said aperture-presetting means and said shutter speed-presetting means and selecting the shutter speed priority mode when said shutter speed-presetting means is operated latest.

2. An exposure control mode-setting system in a camera according to claim 1, wherein said mode-setting means includes means for detecting change in aperture value produced by said aperture-presetting means and setting the aperture priority mode in accordance with the detection and for detecting change in time value produced by said shutter speed-presetting means and setting the shutter speed priority mode in accordance with the detection.

3. An exposure control mode-setting system in a camera according to claim 1, wherein said mode-setting means includes first detection means for detecting the change in aperture value by said aperture-presetting means and then generating an output, and second detection means for detecting the change in time value by said shutter speed-presetting means and then generating an output and wherein said mode-setting means selects the aperture priority mode in response to the output from said first detection means and selects the shutter speed priority mode in response to said second detection means.

4. An exposure control mode-setting system in a camera according to claim 1, wherein said aperture-presetting means includes an aperture stop operating member which can be displaced by the operator to change the aperture value and said shutter speed-presetting means includes a shutter operating member which can be displaced by the operator to change the time value and wherein said mode-setting means selects the aperture priority mode in response to the displacement of said aperture stop operating member and selects the shutter speed priority mode in response to the displacement of said shutter operating member.

5. An exposure control mode-setting system in a camera according to claim 1, which further comprises latch means for acting on said mode-setting means so as to fix the exposure control mode selected by said mode-setting means while rendering said mode-setting means unable to work on said aperture-presetting means and said shutter speed-presetting means being operated afterwards.

6. An exposure control mode-setting system in a camera according to claim 1, wherein said mode-setting means includes:
means for recording the aperture value and the time value selected by said aperture-presetting means and said shutter speed-presetting means respectively; and
means for comparing the aperture value selected anew by said aperture-presetting means and the time value selected anew by said shutter speed-presetting means with the latest aperture value and time value in said recording means.

* * * * *